Oct. 27, 1964  G. G. KLINGER  3,154,073
RESPIRATOR FILTER MOUNTING MEANS
Filed March 1, 1963

INVENTOR.
GUY G. KLINGER
BY
*William J. Ruano*
his ATTORNEY

United States Patent Office 3,154,073
Patented Oct. 27, 1964

3,154,073
RESPIRATOR FILTER MOUNTING MEANS
Guy G. Klinger, Wernersville, Pa., assignor to The Electric Storage Battery Company, Philadelphia, Pa.
Filed Mar. 1, 1963, Ser. No. 262,166
1 Claim. (Cl. 128—146)

This invention relates to a respirator of the type which surrounds the nose, cheeks, and chin of the wearer to protect him from inhaling dusts, and, more particularly, relates to means for mounting a filter within the respirator mask in a readily detachable manner.

In the past, respirators of the type having a detachable filter backing frame have been molded with complicated integrally molded projections for supporting the frame, which have involved difficulty in molding, as well as increasing the cost of production.

Another disadvantage of conventional dust respirator filter mountings is that it is difficult to replace the filter pad since there is a great tendency for the filter pad to slip laterally out of correspondence with the mounting frame, or for the pad to buckle or curl and cause air leakage along the perimeter instead of an air-tight seal.

An object of my invention is to provide a novel means for detachably mounting a filter and filter-backing frame on an open face piece of a respirator in a readily attachable and detachable manner so as to avoid the above-named disadvantages, that is, devoid of integral projections or other complicated constructional features for supporting the filter-backing frame.

A more specific object of the invention is to provide a novel means of attachment between the filter pad and mounting frame to facilitate mounting and replacement of the filter and to provide a smoother and tighter fit between the filter and respirator face piece.

Other objects and advantages will become more apparent from a study of the following description taken with the accompanying drawing wherein.

Figure 1:
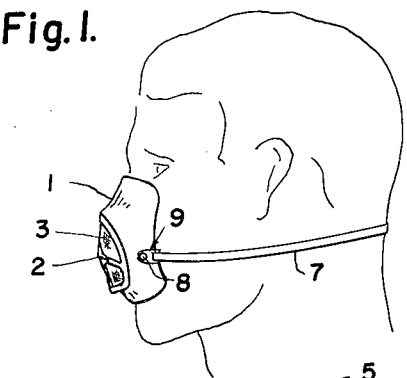
FIG. 1 is a side, elevational view showing a respirator embodying the present invention and in mounted position on face of the wearer.

Referring more particularly to FIG. 1 of the drawing, numeral 1 denotes a respirator mask or face piece of rubber, plastic or other flexible material, having a substantially triangular mouth portion surrounding and closely fitting, in a dust-tight manner, the nose, cheeks and chin of the wearer. The respirator has a grille 2 in the front thereof which provides a support for a filter pad 3 and its supporting frame.

Figure 7:
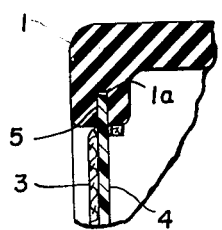
FIG. 7 is an enlarged, fragmentary, cross-sectional view of a front portion of the respirator showing the manner that the filter frame fits therein.

As shown more clearly in FIG. 7, the open front portion of the respirator has an inwardly turned, marginal flange provided with a plurality of spaced grooves 1a into which are fitted radially outwardly projecting lugs or tabs 5 of a filter frame 4, of rigid but flexible plastic or other suitable material. The filter pad 3, of corresponding outline but of somewhat larger area, in accordance with the present invention is provided with a plurality of peripherally spaced slots 6 through which the tabs 5 are inserted so as to keep the filter pad stretched tightly, as well as to prevent relative displacement between the filter pad and frame 4. Thus there will be a dust-tight seal between the perimeter of the filter pad and the inturned flange portion of the respirator, as shown more clearly in FIG. 7.

When it is desired to remove the filter pad for replacement, all that is necessary is to stretch outwardly, in succession, the respective portions of the respirator adjoining the tabs 5, so as to enable withdrawal of the tabs and removal of the frame 4. Then the filter pad 3 is removed from the frame by withdrawal of tabs 5 from slots 6 and a new pad may be substituted.

Figure 4:
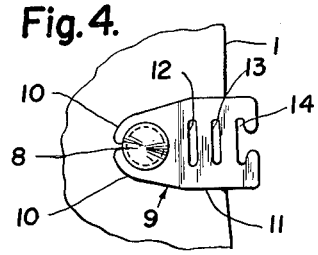
FIG. 4 is an enlarged, side view of the mounting clip for the headband shown in FIG. 1.
Figure 2:
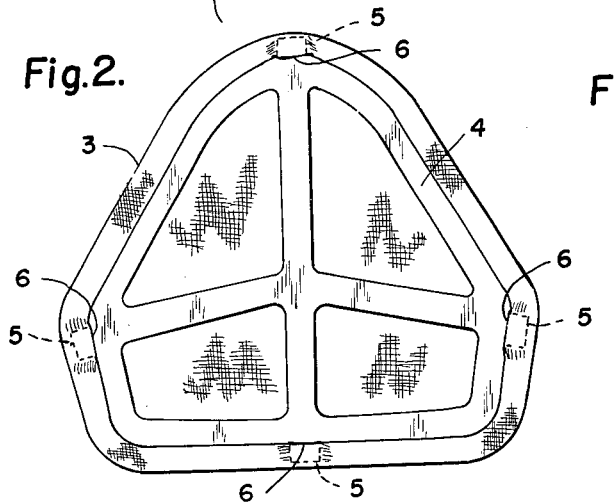
FIG. 2 is an enlarged, rear elevational view of a mounting frame and filter pad embodying the present invention.
Figure 5:
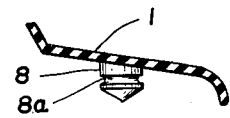
FIG. 5 is a transverse, cross-sectional view of the lug shown in FIG. 1 without the clip.
Figure 6:
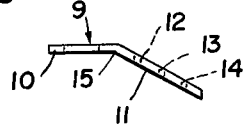
FIG. 6 is a side or edge view of the clip shown in FIG. 4.
Figure 3:
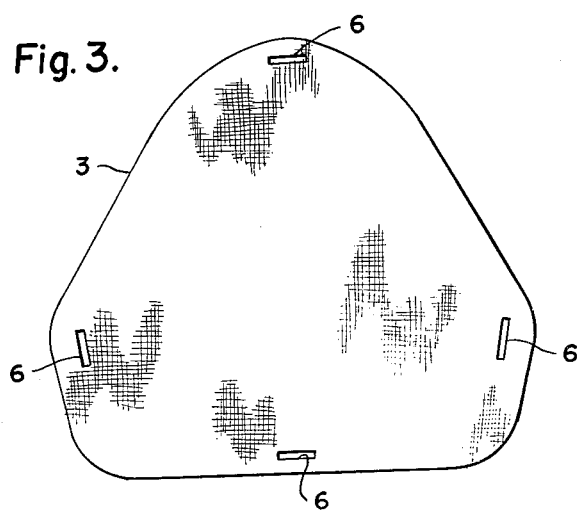
FIG. 3 is an elevational view showing the slotted filter pad of FIG. 2.

FIGS. 4, 5 and 6 show the construction of the filter holding headband and attaching means 9, comprising a lug or stud 8 of sheet metal or plastic integrally molded on or attached to each side of the respirator 1, which stud is provided with a peripheral groove 8a into which is fitted, opposed arcuate shaped fingers 10 of a clip 11, which clip has a plurality of slots 12 and 13 through which the headband 7 is threaded and finally anchored or locked to open end slot 14. The end of the headband is inserted through either slot 12 or 13 from the inside and brought outwardly, thence through slot 14. It will be apparent that the clips 11 may be removed because of the lateral flexibility of the arcuate fingers 10.

Thus it will be seen that I have provided a highly efficient respirator filter mounting means and headband assembly which insures an air-tight fit at all times between the filter and the respirator facepiece sealing surfaces by virtue of placement of slots in the filter pad into which is projected lugs or tabs of a filter mounting frame for not only stretching the filter pad but for preventing relative displacement between the frame and filter pad and thus insure air-tight fit between the filter pad and the respirator facepiece at all times, as well as to facilitate insertion of the pad and frame into the respirator facepiece.

While I have illustrated and described a single specific embodiment of my invention, it will be understood that this is by way of illustration only, and that various changes and modifications may be made within the contemplation of my invention and within the scope of the following claim.

I claim:

A respirator comprising a facepiece of flexible material having an opening in the front thereof bonded by an inturned marginal integral flange portion, said flange portion being provided with a plurality of peripherally spaced slots, a filter pad having a plurality of closed slots disposed along the periphery thereof in spaced relationship, a filter mounting frame of rigid, flexible material having a plurality of radially outwardly extending tabs extending through said slots in the filter pad so as to hold the filter pad taut and to prevent relative displacement between the filter pad and said mounting frame, each of said tabs extending into one of said slots in said inturned flange, and a headband attached to the sides of said facepiece whereby the peripheral portion of the filter pad forms a dust-tight seal with said flange portion of the respirator.

References Cited by the Examiner
UNITED STATES PATENTS

| 330,871 | 11/85 | Chapman | 24—230 |
| 2,022,483 | 11/35 | Upham. | |
| 2,751,904 | 6/56 | Lewis | 128—146 |
| 3,014,479 | 12/61 | Matheson | 128—146 |

FOREIGN PATENTS 848,526  10/39  France.

RICHARD A. GAUDET, *Primary Examiner.*